(No Model.)
T. A. WILLSON.
LENS AND MANUFACTURE THEREOF.
No. 265,206. Patented Sept. 26, 1882.
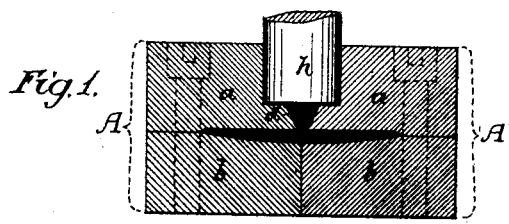
Fig. 1.
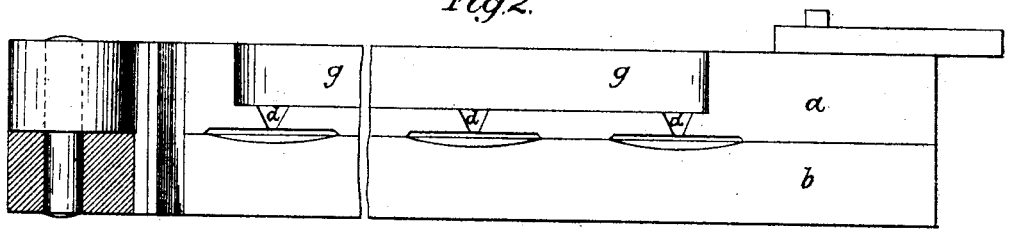
Fig. 2.
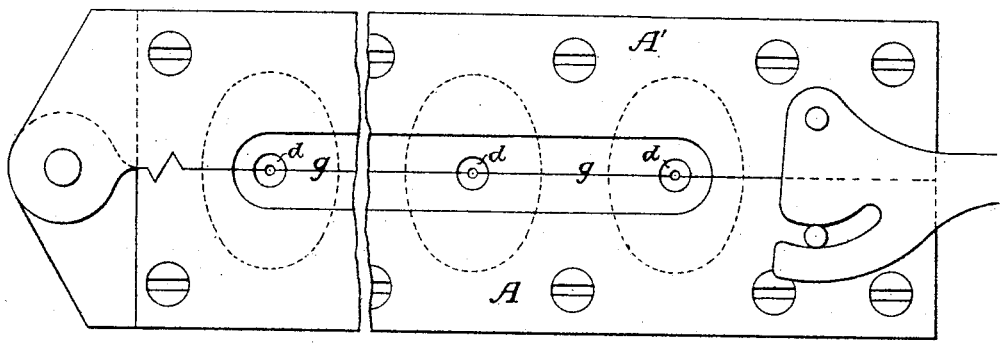
Fig. 3.
Fig. 4.
Fig. 5
Fig. 6.
Witnesses
Harry Drury
Harry Smith
Inventor
Thomas A. Willson
by his Attorneys
Howson & Sons

UNITED STATES PATENT OFFICE.

THOMAS A. WILLSON, OF READING, PENNSYLVANIA.

LENS AND MANUFACTURE THEREOF.

SPECIFICATION forming part of Letters Patent No. 265,206, dated September 26, 1882.

Application filed March 20, 1882. (No model.)

*To all whom it may concern:*

Be it known that I, THOMAS A. WILLSON, a citizen of the United States, and a resident of Reading, Berks county, Pennsylvania, have invented certain Improvements in Lenses and in the Manufacture of the same, of which the following is a specification.

My invention relates to the economical manufacture of lenses for spectacles, eyeglasses, &c.; and it consists in so molding a lens-blank that it can be finished by grinding and polishing the faces only, the edge of the lens being finished in molding the blank, so that the said edge does not require to be ground.

In the accompanying drawings, Figure 1 is a transverse section of a mold for carrying my invention into effect; Fig. 2, a longitudinal section of the mold; Fig. 3, a plan view; and Figs. 4, 5, and 6, sections of different forms of lenses.

In carrying out my invention I prefer to use the mold illustrated in Figs. 1, 2, and 3, and consisting of two parts, A A', hinged together at one end, and confined at the opposite end by any suitable device which will serve to bring the two parts of the mold together and permit the mold to be opened, the device for effecting this purpose consisting in the present instance of a cam-lever pivoted to one part of the mold and having a curved slot adapted to a pin on the other part of the mold. Each part of the mold consists of two bars, *a* and *b*, secured together by set-screws, cavities (three in the present case) being so formed in the bars that when the mold is closed the said cavities will form chambers, one half of each chamber in one part and the other half in the other part of the mold. Each chamber is of such shape as to exactly define the edges of the lens and the faces of the lens-blanks, but is of such a depth that the blank will be somewhat thicker than the finished lens, to allow for grinding and polishing. A recess, *g*, is formed, one half in one part and the other half in the other part of the mold, for the reception of the plunger *h*, and this recess communicates with the aforesaid chambers through gates *d*, one for each chamber. The glass is poured into the recess, and is forced into the chambers through the gates by the plunger, the latter being afterward withdrawn and the mold opened, thereby releasing the lens-blanks, which are complete after removal from the face of each blank of the glass which adhered to it at the point where the gate occurred.

It should be here understood that I do not desire to claim in this application the above-described mold, a description of which has been introduced for the purpose of showing an example of the manner in which my improved lens-blanks and lenses may be made.

After a lens-blank has been thus completed its opposite faces are ground and polished in the usual manner; but as these faces are, by molding, made of a shape and thickness approximating to that to which they have to be reduced, but little grinding will be necessary compared with that which has to be resorted to when crude slabs of glass of uniform thickness have to be ground to the desired concave or convex forms.

As in molding the blank the glass is introduced at a point away from the edge, and as the latter receives the desired conformation from the chamber of the mold, no finishing of the edge will be required, excepting it be the removal of slight local imperfections, the usual tedious and costly plan of shaping and completing the edges by grinding being thus obviated.

I claim as my invention—

1. The mode herein described of manufacturing lens-blanks, the said mode consisting in press-molding glass so that the blank shall have a continuous mold-finished edge to form the finished edge of the lens without grinding, the faces of the blank approximating in form to those of the finished lens, all substantially as set forth.

2. As a new article of manufacture, the within-described lens-blank, the same having a continuous mold-finished edge, forming the finished edge of the lens without grinding, and faces approximating to those of the finished lens, as set forth.

3. The mode herein described of manufacturing lenses, the said mode consisting in first press-molding glass into a lens-blank having a continuous mold-finished edge, and subsequently grinding and polishing the opposite faces only of the blank, as specified.

4. As a new article of manufacture, a pressed glass lens having ground and polished opposite faces and a continuous mold-finished unground edge, as set forth.

In testimony whereof I have signed my name to this specification in the presence of two subscribing witnesses.

THOMAS A. WILLSON.

Witnesses:
 WM. W. ESSICK,
 M. L. MILLER.